(12) United States Patent
Haevescher et al.

(10) Patent No.: US 8,552,723 B2
(45) Date of Patent: Oct. 8, 2013

(54) MEASURING ARRANGEMENT

(75) Inventors: Rainer Haevescher, Stemwede (DE);
Achim Fürhoff, Kirchlengern (DE);
Maik Hubert, Bünde (DE)

(73) Assignee: Lemförder Electronic GmbH,
Espelkamp (DE)

( * ) Notice: Subject to any disclaimer, the term of this patent is extended or adjusted under 35 U.S.C. 154(b) by 995 days.

(21) Appl. No.: 12/522,428

(22) PCT Filed: Dec. 17, 2007

(86) PCT No.: PCT/DE2007/002268
§ 371 (c)(1),
(2), (4) Date: Jul. 8, 2009

(87) PCT Pub. No.: WO2008/083653
PCT Pub. Date: Jul. 17, 2008

(65) Prior Publication Data
US 2010/0039108 A1 Feb. 18, 2010

(30) Foreign Application Priority Data
Jan. 9, 2007 (DE) .......................... 10 2007 002 085

(51) Int. Cl.
*G01R 33/00* (2006.01)
(52) U.S. Cl.
USPC .......................................... 324/261; 324/262

(58) Field of Classification Search
USPC .................................................. 324/260, 261
See application file for complete search history.

(56) References Cited

U.S. PATENT DOCUMENTS 3,855,525 A 12/1974 Bernin
5,422,566 A * 6/1995 Boenning ................. 324/117 R

FOREIGN PATENT DOCUMENTS

| DE | 199 33 244 | 2/2000 |
| DE | 102 49 919 | 5/2004 |
| EP | 0 427 882 | 5/1991 |
| EP | 1 524 504 | 4/2005 |

* cited by examiner

*Primary Examiner* — Reena Aurora
(74) *Attorney, Agent, or Firm* — McGlew and Tuttle, P.C.

(57) ABSTRACT

A measuring arrangement is provided with a magnetic field-sensitive sensor (2), which includes a body (10) formed of a magnetic material. The body has a continuous recess (12) and a wall (26) defining same. The sensor (2) has at least one electric conductor (5), which extends between the ends and is passed through the recess (12). A magnet (22), which can be moved relative to the body (10), provides a magnetic field by which the permeability of the body (10) can be varied as a function of the distance between the body (10) and the magnet (22). An analysis means (4), which can be or is connected to the conductor (5) and by which the change in the permeability of the body (10) can be detected. The conductor (5) does not loop around the wall (26).

19 Claims, 8 Drawing Sheets

MEASURING ARRANGEMENT

CROSS REFERENCE TO RELATED APPLICATIONS

This application is a United States National Phase application of International Application PCT/DE2007/002268 and claims the benefit of priority under 35 U.S.C. §119 of German Patent Application DE 10 2007 002 085.8 filed Jan. 9, 2007, the entire contents of which are incorporated herein by reference.

FIELD OF THE INVENTION

The present invention pertains to a measuring arrangement with a magnetic field-sensitive sensor, which comprises a body made of a magnetic material, which has a continuous recess and a wall defining said recess, and at least one electric conductor, which extends between two ends and is passed through the recess; with a magnet, which is movable relative to the body and by the magnetic field of which the permeability of the body can be varied as a function of the distance between the body and the magnet; and with an analysis means, which can be or is connected to the conductor and by means of which the change in the permeability of the body can be detected. The present invention pertains, furthermore, to a magnetic field-sensitive sensor for such a measuring arrangement.

BACKGROUND OF THE INVENTION

A coil arrangement as a magnet sensor comprising at least one toroidal core coil, which has a closed core, which is provided with a coil and consists of a ferromagnetic material, and a magnet, which can be moved past in a relative motion, is known from DE 102 49 919 A1. The magnetic field to be detected brings about a change in the permeability of the core and hence in the inductance of the coil, which can be detected with an analysis means.

The drawback of this coil arrangement is the relatively great manufacturing effort needed for winding the coil.

SUMMARY OF THE INVENTION

Based on this state of the art, the basic object of the present invention is to provide a measuring arrangement mentioned in the introduction or the magnetic field-sensitive sensor mentioned in the introduction such that the manufacturing effort can be reduced.

According to the present invention a measuring arrangement is provided having a magnetic field-sensitive sensor, which comprises a body made of a magnetic material, which has a continuous recess and a wall defining this, and at least one electric conductor, which extends between two ends and is passed through the recess; a magnet, which can be moved in relation to the body and by the magnetic field of which the permeability of the body can be varied as a function of the distance between the body and the magnet; and an analysis means, which can be or is connected to the conductor and by means of which the change in the permeability of the body can be detected, wherein the conductor does not loop around the wall. The conductor extends between the two ends thereof.

In the embodiment of the measuring arrangement according to the present invention, the electric conductor can be simply passed through the recess without winding the conductor around the wall. This simplifies the manufacturing effort for the magnetic field-sensitive sensor and hence for the measuring arrangement to a rather substantial extent. The magnetic field-sensitive sensor surprisingly delivers analyzable signals and behaves, from an electrical engineering viewpoint, like or nearly like a coil, which is wound with one turn on the wall.

The wall preferably forms a ring, which surrounds the recess and is especially closed. Thus, especially a ring or toroidal core is formed by the body made of magnetic material. The cross section of the ring may have any desired shape. However, the cross section is preferably circular ring-shaped.

The magnetic material is preferably a highly permeable material, whose permeability varies with changing distance between the magnet and the body. In particular, the magnetic material assumes its saturation magnetization when the distance (switching distance) between the magnet and the body drops below a certain value, so that the relative permeability drops to the value 1 or approximately to the value 1. This comparatively great change in permeability brings about an appreciably measurable change in the inductance of the electric conductor, which can be detected by means of the analysis means. The magnetic material thus becomes especially magnetically saturated or assumes the saturation magnetization depending on the distance between the body and the magnet.

A soft magnetic material is preferably used as the material. The relative permeability or initial permeability of the magnetic material is, in particular, in a range of about 4,000 to 150,000 or higher. These high permeabilities can be obtained, for example, with a nanocrystalline material, especially with a nanocrystalline metal. The nanocrystalline material may be, e.g., nanocrystalline iron or an iron-based nanocrystalline alloy. As an alternative, it is also possible to use a ferrite or another ferromagnetic material as the magnet material. The conductor is especially made of metal, e.g., copper.

The body may be arranged between two walls, which are located opposite each other and through which the conductor extends and between which the conductor preferably extends exclusively in a straight line. In particular, the conductor is firmly connected to one of the walls, so that to mount the sensor, the conductor is first passed through the recess of the body and then through the other wall, which has a suitable continuous hole for this. The body is arranged, in particular, in a housing, which may surround both or one of the walls. The housing and/or the walls preferably consist of a plastic and may be manufactured as injection moldings.

One of the walls forms especially the bottom of a pot-shaped housing, which can be closed or is closed with a cover, which is formed by the other wall. The at least one conductor may be held by a bracket or embedded in same, which is preferably firmly connected to the cover or is made in one piece therewith. The floor may have a through opening, which is engaged by the bracket. Furthermore, the bracket passes through the body consisting of magnetic material, which is arranged in the housing, so that an especially compact and easy-to-mount sensor is obtained, on the whole.

According to one variant, the housing may also have a ring-shaped recess, into which the body made of magnetic material will be or is pushed or introduced. The recess encircles a housing inner part, through which the at least one conductor is passed. Furthermore, a housing outer part surrounds or encircles the body, which is thus extensively protected against contamination and the action of external forces. The housing inner part is made especially in one piece or is firmly connected to the housing outer part, so that the ring-shaped recess preferably forms a ring-shaped blind hole. The term blind hole shall be defined especially such that the recess is defined on one side by a bottom. The housing inner part is especially of a cylindrical design. Furthermore, the housing outer part may have an outer surface with at least one flat surface area, on which, e.g., a suction mechanism of an automatic onserter can act. This housing also preferably consists of plastic and may be manufactured as a plastic injection molding.

The conductor may be bent outside the housing, so that the body can be placed on the printed circuit board to contact the two ends of the conductor with contact surfaces of a printed circuit board. However, the electrical conductor is made, on the whole, straight. To mount a sensor of such a design on a printed circuit board, a recess may be prepared in said printed circuit board, into which the body is inserted or hung. The ends of the conductor now lie on the edges of the recess and can be brought into contact there with contact surfaces arranged on the surface of the printed circuit board. The ends of the conductor thus form contacts for electrically contacting the conductor.

The conductor may have a square cross section at its end areas or continuously, so that the soldering of the end areas of the conductor to the contact surfaces is facilitated. Mounting on the printed circuit board is also facilitated because the sensor cannot roll away. Furthermore, four surfaces are, on the whole, available for contacting.

It may be meaningful for safety reasons to provide the sensor as a redundant sensor in order to make it possible to continue to operate with the redundant sensor in case of failure of the sensor. The sensor as a whole is usually provided for this purpose as a whole as multiple sensors, as a result of which the space requirement and the manufacturing costs may, however, increase. It is possible in the measuring arrangement according to the present invention for the sensor to have at least one additional electric conductor, which extends between two other ends, is passed through the recess and especially does not loop around the wall. The conductors are preferably of an identical design and may extend in parallel to one another. Furthermore, the other ends of the additional conductor form especially contacts for electrically contacting the additional conductor.

It is thus possible to design a redundant magnetic field-sensitive sensor with the use of common components or of a common component (body made of magnetic material). Since the body made of magnetic material can usually be considered to the fail-safe, the joint use of components also has no disadvantages in terms of safety compared with the multiple arrangement of fully independent sensors. The passing of at least two separate conductors through the recess has additionally the advantage that the conductors can mutually excite each other, so that not only fail safety but additionally also a mutual checking of the ability to function or diagnosis is possible.

The magnetic material for the body is made available especially in the form of a film or a strip, so that the film or strip can be rolled up to form the body consisting of magnetic material. The wall is thus preferably formed from a wound-up strip of magnetic material and has especially a ring shape. The strip shape of the magnetic material has the advantage that relatively small strip thicknesses can thus be embodied. This leads to a relatively high electric resistance of the strip, so that eddy current losses can be kept low. Furthermore, it is possible to impart a certain elasticity to the body by the winding up.

The change in the permeability of the magnetic material can be determined, e.g., by sending at least one electric pulse to the conductor. The pulse response from the conductor is measured and analyzed, and different permeabilities lead to different pulse responses. The sending of the electric pulse as well as the analysis of the pulse response is carried out especially by means of the analysis means, which may have a microprocessor or microcontroller for this. The analysis is preferably carried out digitally, in which case the pulse response or the signal coming from the conductor is sent to an analog-digital converter, which is integrated especially in the microcontroller. It is now possible to send the pulse response or the signal coming from the conductor to the analog-digital converter without magnification, so that no amplifier is preferably connected between the conductor and the analog-digital converter.

If a plurality of magnetic field-sensitive sensors are provided, each of the sensors may be connected to a separate analysis means. However, the sensors are preferably connected to the inputs of at least one multiplexer, whose output is connected, e.g., to the analysis means. However, the multiplexer may also be part of the analysis means. A plurality of sensors can thus be connected or polled with the same analysis means.

Sensors arranged one after another in space may have bodies consisting of magnetic material, which are separated from each other. As an alternative, it is possible to use a single body consisting of magnetic material for the sensors, whose conductors are arranged one after another in space and are passed through the wall of the body. This single body consisting of magnetic material is then divided into a plurality of logic bodies consisting of magnetic material, which are each associated with one of the sensors. However, the logic bodies consisting of magnetic material are also uncoupled magnetically from one another, so that the magnetic field of the magnet does not generate magnetic saturation simultaneously in a plurality of logic bodies.

The measuring arrangement according to the present invention is used especially to detect the position of a first component relative to a second component. The magnet may be provided now at the first component and the at least one magnetic field-sensitive sensor at the second component. However, a plurality of magnetic field-sensitive sensors, which are especially of identical design, are preferably provided at the second component, by which sensors the first component with the magnet can be moved past. A plurality of positions of the first component relative to the second component can thus be detected by means of the sensors. In particular, the measuring arrangement is used for the gear selector lever means of a motor vehicle, so that the first component is formed, e.g., by a selector lever and the second component by, e.g., a bracket that is a rigid part of the body and relative to which the selector lever can be pivoted or adjusted into different shift positions. The sensors are associated with the different shift positions, so that the analysis means can actuate the vehicle transmission as a function of the shift position detected.

The present invention pertains, furthermore, to a magnetic field-sensitive sensor with a body consisting of a magnetic material, which said body has a continuous recess and a wall defining same and with at least one electric conductor, which extends between two ends and is passed through the recess, wherein the permeability of the body can be varied as a function of the external magnetic field, and wherein the conductor does not loop around the wall. This magnetic field-sensitive sensor may be varied according to all the embodiments mentioned and is used especially for the measuring arrangement according to the present invention. Furthermore, the external magnetic field is preferably generated by the above-described magnet, which is especially a permanent magnet. As an alternative, this magnet may, however, also be an electromagnet. The magnet material can assume especially the state of magnetic saturation due to the external magnetic field.

The sensor is preferably used to detect the position of an actuating element, which is designed as a magnet here. It shall, in particular, be possible to recognize whether the distance between the magnet and the body consisting of magnetic material has become shorter than the switching distance or not. On approach, the magnet preferably induces saturation of the toroidal core, i.e., the permeability drops significantly. This effect can be analyzed by measuring different electric variables. Examples of such analysis are: Analysis of the pulse response to a square wave signal, determination of the inductance and/or measurement of the phase response or the amplitude of an alternating signal.

The advantage of the measuring arrangement according to the present invention is that because of its design, the sensor can be manufactured highly cost-effectively and in a process that can be automatic and/or the sensor can service two independent analysis circuits in its redundant embodiment, so that only one sensor is needed instead of the two sensors needed before to achieve redundancy. Furthermore, the ability to make a diagnosis is possible not only in the actuated state but in the non-actuated state as well, because both electric conductors can excite themselves or mutually each other.

The sensor may be considered, in terms of electrical engineering, to be a coil, which has a highly permeable toroidal core. The inductance sufficient for the electric sensor function can be obtained with one turn only, and a turn can be embodied in the toroidal core by simply passing an electric conductor through the toroidal core. The additional passing through of additional electric conductors makes possible a redundant signal analysis. Numerous advantages arise from this optimally simplified construction in the manufacture and sale of the sensor, some of which will be mentioned below: Simplified, automated manufacturing process; low manufacturing tolerances due to the construction increase the sensory measuring accuracy; elimination of the winding operation necessary in case of coils; cost savings compared to current sensor processes; embodiment of redundancy in one component; increased reliability of function/availability due to reduction of the complexity of the component; possibility of diagnosis; reduced effort for the electronic circuit and less effort for expansion by additional sensors in a system compared to other inductive solutions; temperature compensation that can be controlled by the properties of the material, because the thermal properties of the magnet and the saturation induction of the sensor toroidal core can mutually offset each other; great signal/noise ratios for magnetic noise fields due to the toroidal core with high saturation induction.

The present invention will be described below on the basis of preferred embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
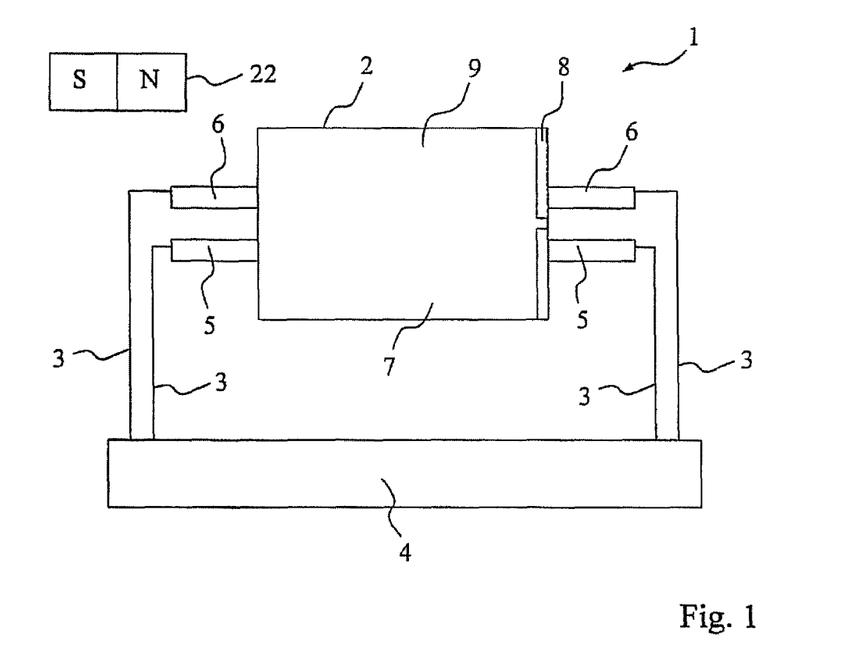
FIG. 1 is a schematic view of a measuring arrangement according to a first embodiment of the present invention.
Figure 2:
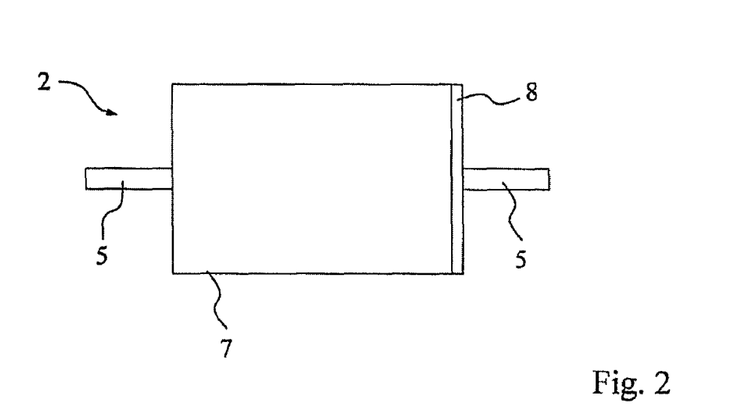
FIG. 2 is a side view of the sensor according to FIG. 1.
Figure 3:
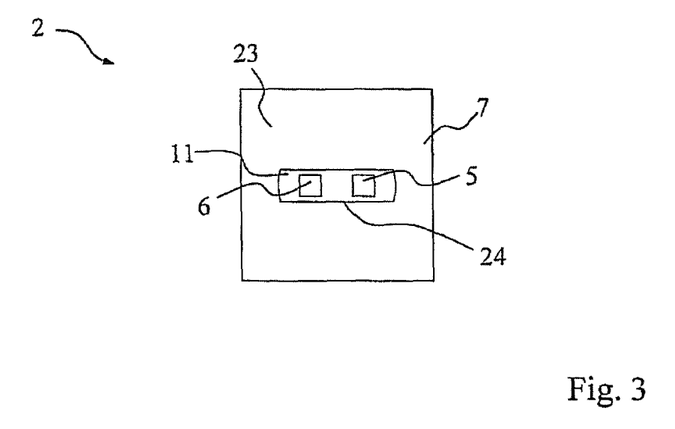
FIG. 3 is a rear view of the sensor according to FIG. 1.

Referring to the drawings in particular, FIG. 1 shows a schematic view of a measuring arrangement 1 according to a first embodiment of the present invention, wherein a magnetic field-sensitive sensor 2 is connected to an analysis means 4 via electric lines 3. The magnetic field-sensitive sensor 2 has two electric conductors 5 and 6, to which the electric lines 3 are connected, wherein the electric conductors 5 and 6 pass through a housing 7 of the sensor 2. Housing 7 is of a pot-shaped design and is closed by means of a cover 8. The outer surface 9 of housing 7 is flat at least in some areas, so that the sensor 2 can be fixed with the suction mechanism of an automatic onserter. Furthermore, a magnet 22 is shown, whose magnetic field can interact with the magnetic field-sensitive sensor 2. Sensor 2 is shown in a top view in FIG. 1, whereas sensor 2 is shown in a side view in FIG. 2 and in a rear view in FIG. 3.

Figure 4:
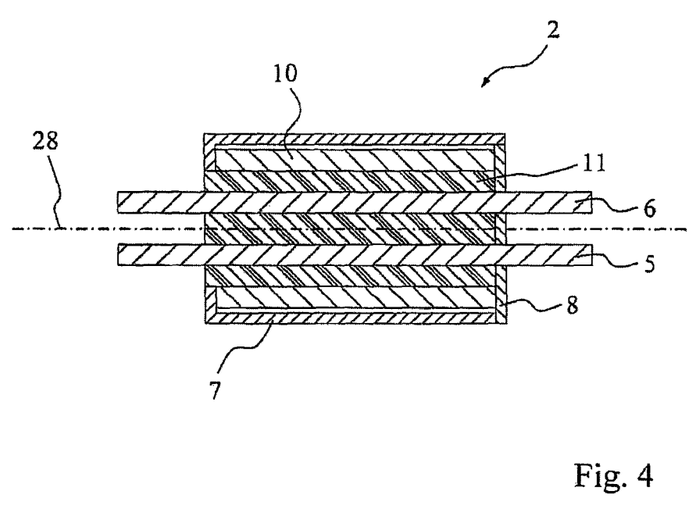
FIG. 4 is a longitudinal sectional view through the sensor according to FIG. 1.

FIG. 4 shows a longitudinal section through sensor 2, wherein a ring-shaped body 10 consisting of magnetic material is arranged in housing 7, and the two conductors 5 and 6, which are as a whole straight here and extend in parallel to one another, extend through said body 10. These conductors 5 and 6 are maintained at spaced locations from one another by a bracket 11, which is preferably firmly connected to the cover 8. A continuous recess 24, which is engaged by the bracket 11, is provided in the bottom 23 of housing 7, the conductors 5 and 6 passing through the recess 24. Sensor 2 may be hung especially into a recess of a printed circuit board, which will be explained in connection with FIG. 10.

Figure 12:
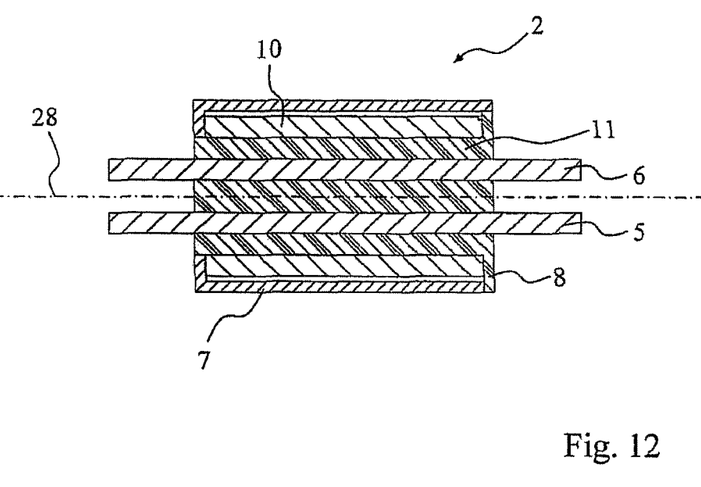
FIG. 12 is a longitudinal section through a sensor according to a variant of the first embodiment.

Cover 8 and bracket 11 may be two different parts, which are, e.g., bonded to one another or are firmly connected to one another in another manner. According to a variant of the first embodiment, bracket 11 is made in one piece with the cover 8, which can be seen in FIG. 12. Bracket 11 is made especially of plastic.

Figure 5:
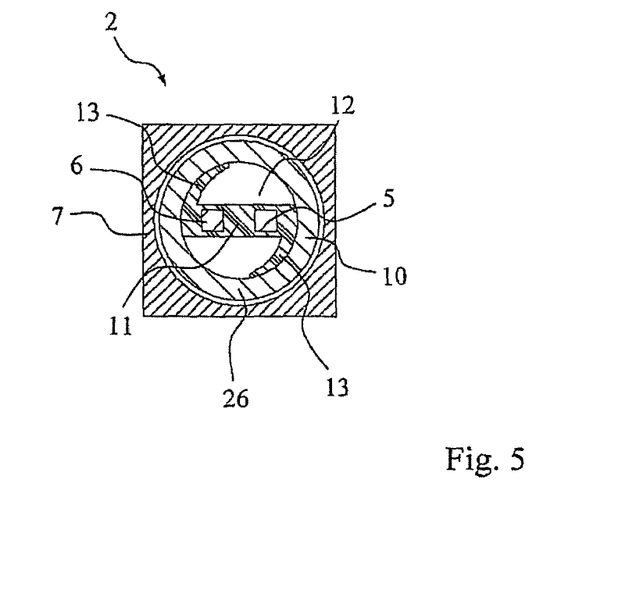
FIG. 5 is a cross sectional view through the sensor according to FIG. 1.
Figure 6:
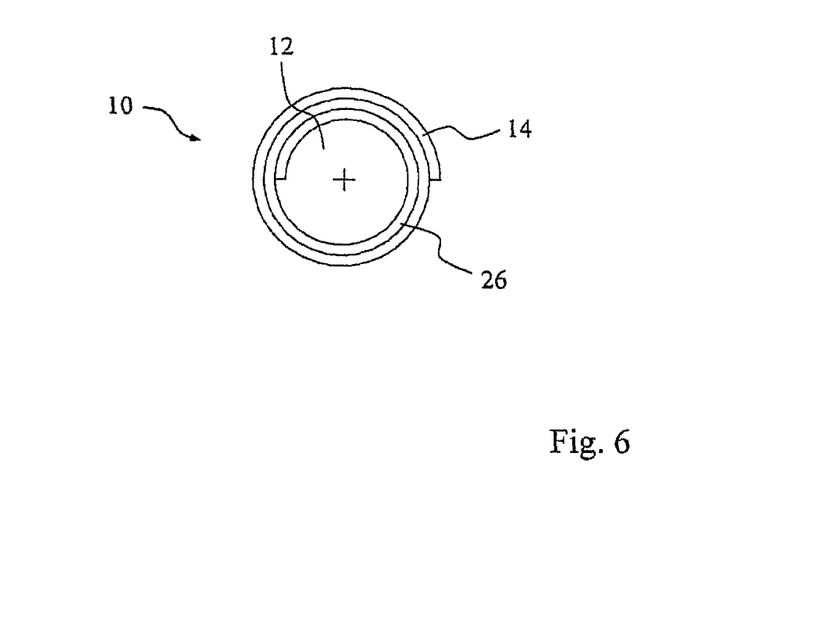
FIG. 6 is a schematic view of a body consisting of magnetic material.

FIG. 5 shows a cross section through sensor 2, which shows that the conductors 5 and 6 are embedded in bracket 11, which is inserted into a continuous recess 12 of the body 10. To fix or mount the body 10 in the housing 7, bracket 11 is provided with a fixing means, which has especially spring-mounted or elastic straps 13, which are in contact with the inner side of the wall 26 of body 10, which said wall defines recess 12. Body 10 is preferably made of a strip 14, which is wound up to form the body 10, which is schematically shown in FIG. 6.

Figure 7:
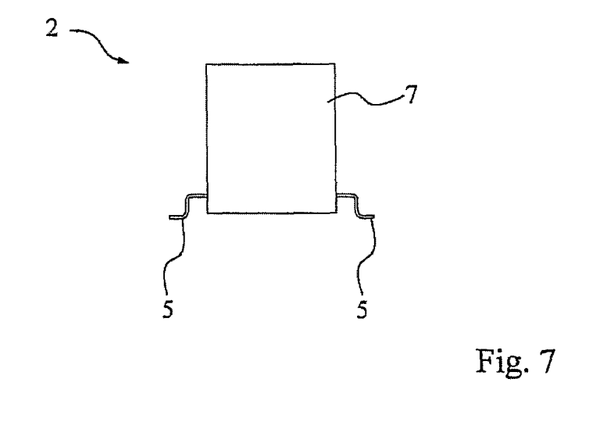
FIG. 7 is a side view of a sensor according to a second embodiment of the present invention.

FIG. 7 shows a magnetic field-sensitive sensor 2 according to a second embodiment of the present invention, wherein features identical or similar to those of the first embodiment are designated by the same reference numbers as in the first embodiment. The electric conductors 5 and 6 are bent outside the housing and are designed as feet, which can be brought into contact with contact surfaces of a printed circuit board. Conductors 5 and 6 extend as straight conductors within housing 7 and through the body 10 consisting of magnetic material.

Figure 8:
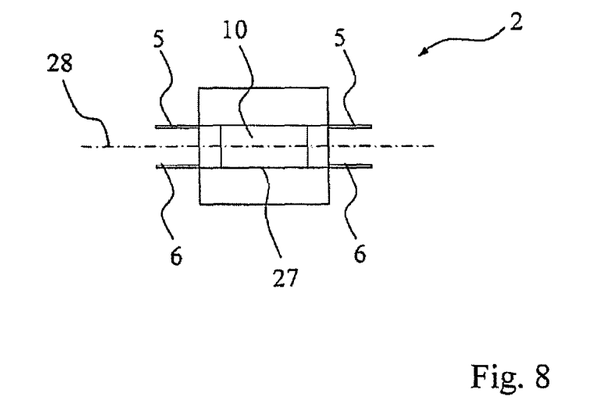
FIG. 8 is a bottom view of the sensor according to FIG. 7.
Figure 9:
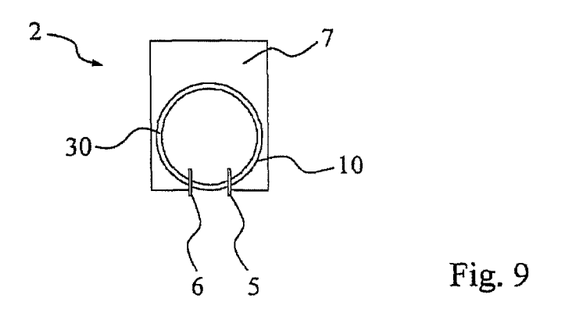
FIG. 9 is a front view of the sensor according to FIG. 7.

FIG. 8 shows the body 10 through an opening 27, which is provided in the underside of housing 7 and which may, however, alternatively also be closed or absent. FIG. 9 shows a front view of sensor 2, wherein the ring-shaped design of body 10 is shown, which is preferably inserted or pushed into a ring-shaped recess 30 of housing 7. Body 10 may be fixed in housing 7, e.g., by means of adhesive or by a mechanical locking. Body 10 may have a design identical to that in the first embodiment.

Figure 13:
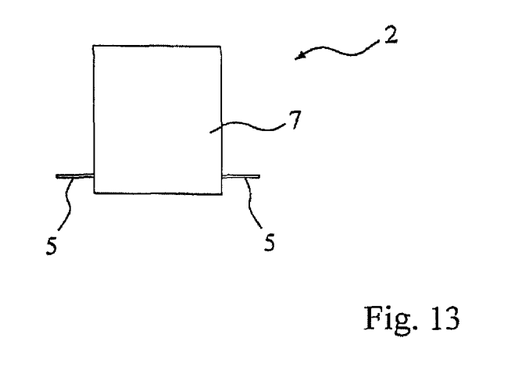
FIG. 13 is a side view of a sensor according to a variant of the second embodiment.

The conductors 5 and 6 are bent outside the housing in the second embodiment, so that the sensor may be especially a surface-mount device (SMD). However, according to a variant of the second embodiment, the electric conductors 5 and 6 may also be straight, on the whole, which is shown in FIG. 13. Sensor 2 may be hung in this case especially into a recess of a printed circuit board, which is explained in connection with FIG. 10.

Figure 10:
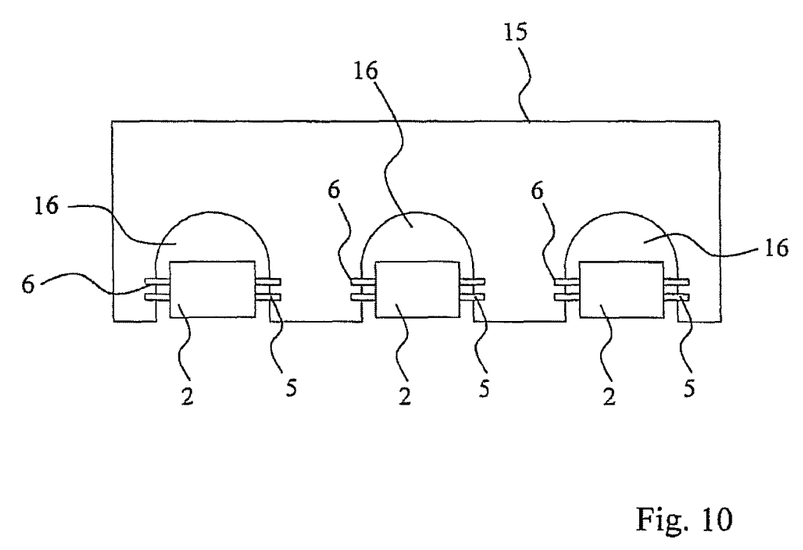
FIG. 10 is a printed circuit board with a plurality of sensors.

FIG. 10 shows a plurality of sensors 2, which are mounted on a printed circuit board 15. Corresponding to the number of sensors 2 to be attached, recesses 16 are milled into the printed circuit board 15, and the sensors 2 can be hung into said recesses 16. The sensors 2 are held now by their electric conductors 5 and 6, which lie on the printed circuit board 15 in the area of the edges of the recesses 16. When viewed in the longitudinal direction 28 of the sensors 2, the extension of the recesses 16 is thus greater than the length of housing 7 but smaller than the length of the conductors 5 and 6. Sensors 2 of both embodiments may be used for this type of mounting. However, sensors 2 whose conductors 5, 6 are, on the whole, straight are preferred. The introduction or suspension of the sensors 2 into the recesses 16 has especially the advantage that magnet 22 can be brought relatively close to the individual sensors 2 without the printed circuit board 15 being inserted between them.

Figure 11:
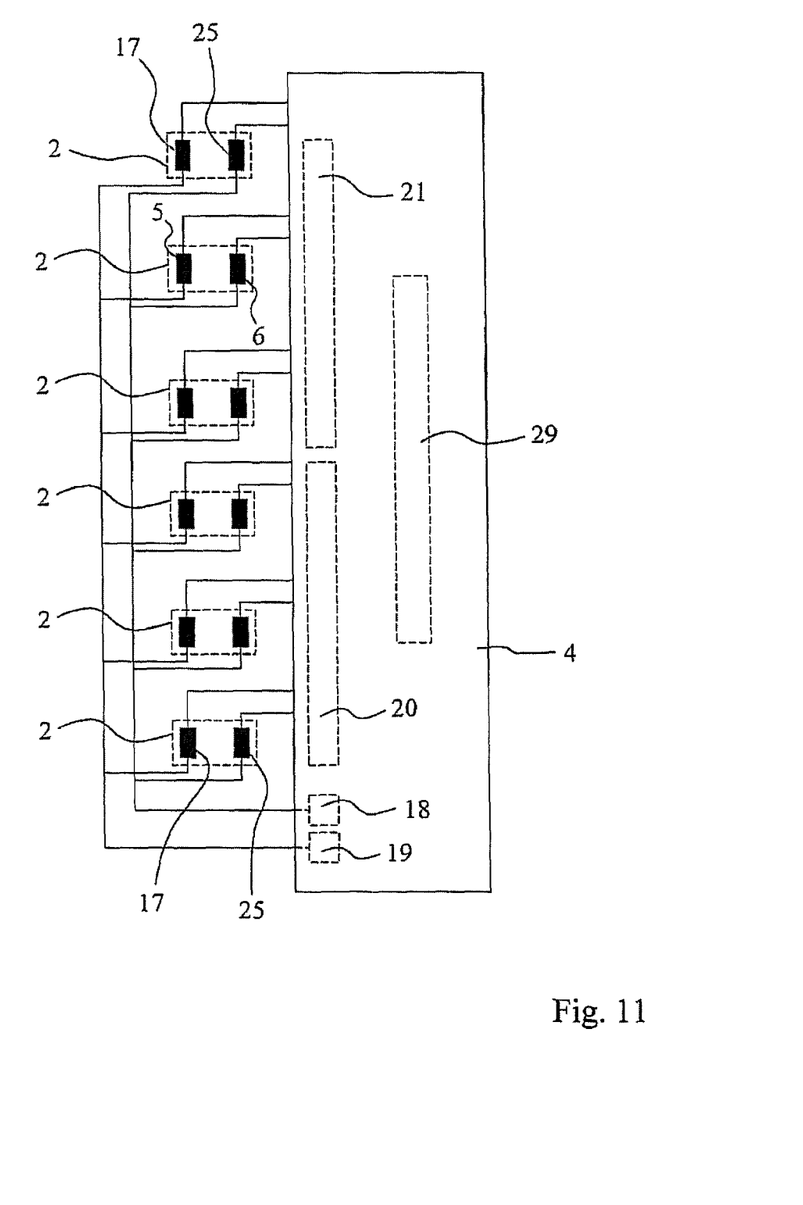
FIG. 11 is a schematic block diagram with a plurality of sensors and analysis means.

FIG. 11 shows a schematic circuit diagram of six sensors 2, wherein the conductors 5 and 6 of each sensor 2 are represented as respective inductances 17 and 25. The analysis means 4 has two signal transmitters 18 and 19, wherein the conductors 6 are electrically connected at one end to the signal transmitter 18 and the conductors 5 are electrically connected at one end to the signal transmitter 19. Furthermore, the conductors 5 and 6 are connected at the other end to two multiplexers 20 and 21, whose output signals are processed for analysis purposes and/or diagnostic purposes. This further processing takes place, e.g., with a microprocessor or microcontroller 29.

Figure 14:
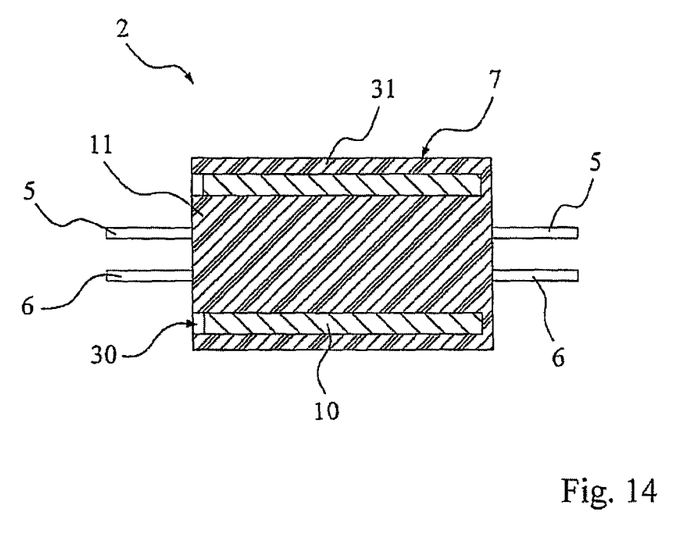
FIG. 14 is a sectional view of the sensor according to the second embodiment.

FIG. 14 shows a sectional view of the second embodiment, wherein housing 7 has the ring-shaped recess 30, into which body 10 is pushed, and is designed especially as a blind hole. Housing 7 has a housing outer part 31 and a housing inner part 11, through which the conductors 5 and 6 extend, so that the housing inner part 11 forms at the same time a bracket for the conductors 5 and 6. The housing inner part 11 is made in one piece with the housing outer part 31, and housing 7 is made as a whole on plastic. Housing 7 according to the variant shown in FIG. 13 has a corresponding design.

While specific embodiments of the invention have been described in detail to illustrate the application of the principles of the invention, it will be understood that the invention may be embodied otherwise without departing from such principles.

The invention claimed is:

1. A measuring arrangement comprising:
    a magnetic field-sensitive sensor comprising a body formed of a magnetic material, which has a continuous recess and a wall defining said continuous recess, an electric conductor, which extends between two ends of said body and passes through the recess and a magnet, which is movable relative to the body and by the magnetic field of which the permeability of the body can be varied as a function of a distance between the body and the magnet; and
    an analysis means, which can be or is connected to the conductor, said analysis means for detecting change in the permeability of the body, wherein said conductor does not loop around the recess.

2. A measuring arrangement in accordance with claim 1, wherein the wall has a ring surrounding the recess.

3. A measuring arrangement in accordance with claim 1, wherein the body is arranged between two mutually opposite walls of a housing, through which walls the conductor extends and between which the conductor extends exclusively in a straight line.

4. A measuring arrangement in accordance with claim 1, wherein the conductor is straight or substantially straight.

5. A measuring arrangement in accordance with claim 1, wherein the conductor has a square cross section.

6. A measuring arrangement in accordance with claim 1, wherein the sensor further comprises an additional electric conductor extending between ends of the body, passing through the recess and not looping around the wall.

7. A measuring arrangement in accordance with claim 6, wherein the conductors are of an identical design and extend in parallel to one another.

8. A measuring arrangement in accordance with claim 1, wherein the body is formed of a wound-up strip.

9. A measuring arrangement in accordance with claim 1, wherein at least one electric pulse can be sent by the analysis means to the sensor and the pulse response can be analyzed by means of the analysis means.

10. A measuring arrangement in accordance with claim 1, further comprising a second magnetic field-sensitive sensor, wherein the sensors are of an identical design and are connected to at least one multiplexer of the analysis means.

11. A measuring arrangement in accordance with claim 1, wherein said magnet is located at a position outside said body.

12. A magnetic field-sensitive sensor for a measuring arrangement the magnetic field-sensitive sensor comprising:
    a body formed of a magnetic material, the body having a continuous recess and a wall defining same; and
    an electric conductor, which extends between two ends and is passed through the recess, wherein the permeability of the body can be varied as a function of an external magnetic field, wherein the conductor does not loop around the wall.

13. A sensor in accordance with claim 12, wherein the wall forms a ring surrounding the recess.

14. A sensor in accordance with claim 13, wherein the body is arranged between two mutually opposite walls of a housing, through which the conductor extends and between which conductor extends exclusively in a straight line.

15. A sensor in accordance with claim 14, wherein:
- the housing has a ring-shaped recess, which is defined on one side by a bottom and into which the body formed of magnetic material is pushed;
- the ring-shaped recess encircles a housing inner part, through which the conductor or conductors is/are passed; and
- the body is encircled by a housing outer part, which is firmly connected to or is made in one piece with the housing inner part.

16. A sensor in accordance with claim 13, further comprising:
- an additional electric conductor, which extends between two other ends and is passed through the recess and which does not loop around the wall.

17. A sensor in accordance with claim 16, wherein the conductors are of identical design.

18. A sensor in accordance with claim 16, wherein the conductor or conductors are embedded in a bracket, which is firmly connected to or is made in one piece with a cover, wherein the bracket engages an opening of a bottom of a pot-shaped housing, which is closed by means of the cover, wherein the body formed of magnetic material is arranged in the housing and the bracket passes through the body.

19. A sensor in accordance with claim 12, wherein said external magnetic field is generated via a magnet located at a position outside of said housing.

* * * * *